US005095603A

United States Patent [19]

Carruthers et al.

[11] Patent Number: 5,095,603

[45] Date of Patent: Mar. 17, 1992

[54] DRUM BRAKE SERVICE TOOL AND METHOD OF USING THE SAME

[76] Inventors: Vincent E. Carruthers, R.R. #7, Royal Road, Fredericton, New Brunswick, Canada, E3B 4X8; William P. Sowers, R.R. #1, Burtts Corner, New Brunswick, Canada, E0H 1BO; Ralph McConnell, 122 Canada Street, Fredericton, New Brunswick, Canada, E3A 3Z6

[21] Appl. No.: 609,315

[22] Filed: Nov. 5, 1990

Related U.S. Application Data

[63] Continuation-in-part of Ser. No. 385,043, Jul. 26, 1989, abandoned.

[51] Int. Cl.[5] .............. B23P 19/04

[52] U.S. Cl. .............. 29/227; 29/267; 81/486; 254/10.5; 254/131

[58] Field of Search .............. 81/486, 488; 29/267, 29/225, 227, 233, 270, 271, 272, 273, 226, 228, 248, 267; 254/131, 10.5; 7/100

[56] References Cited

U.S. PATENT DOCUMENTS

| | | | |
|---|---|---|---|
| 1,144,548 | 6/1915 | Jones | 29/225 |
| 2,490,160 | 12/1949 | Riccio | 29/227 |
| 2,685,731 | 8/1954 | Vertin | 29/227 |
| 2,704,200 | 3/1955 | Call | 254/131 |
| 2,948,058 | 8/1960 | Culkosky | 29/270 |
| 3,071,849 | 1/1963 | Krohm | 29/270 |
| 3,290,769 | 12/1966 | Kashergen | 254/131 |
| 4,976,022 | 12/1990 | Thomton | 29/267 |
| 5,003,680 | 4/1991 | Vesely et al. | 29/267 |

FOREIGN PATENT DOCUMENTS

| | | | |
|---|---|---|---|
| 3740465 | 2/1989 | Fed. Rep. of Germany | 29/227 |
| 0006134 | 1/1982 | Japan | 29/227 |

*Primary Examiner*—Roscoe V. Parker
*Attorney, Agent, or Firm*—Gowling, Strathy & Henderson

[57] ABSTRACT

A drum brake service tool and a method of using the same is disclosed. The tool comprises a lever having a pair of spaced, parallel arms disposed at one end thereof, the arms being adapted to receive a brake spring substantially perpendicularly therebetween. A brake-spring retaining mechanism is disposed proximate the free end of each of the arms. One of the free ends of the brake spring is passed over the brake-spring pin of one of the first or second brake shoes. The brake-spring is then engaged in between the arms of the lever. The lever is pivoted on the cam to extend the brake-spring to the point that the other free end of the spring lies proximate the brake-spring pin of the second brake shoe. The free end of the spring is then engaged with the pin of the second brake shoes. The tool may also be used to remove or install a brake roller in the brake shoes. In this instance, the tool is provided with a pair of L-shaped spurs mounted substantially parallel to each other on two sides of the lever, said sides being perpendicular to the width of the lever and said spurs being disposed spaced a distance from each other which is being substantially equal to said width of the lever. It is only necessary to use one hand to operate this tool, leaving the other hand free to position the brake-spring or brake roller for installation or removal.

2 Claims, 3 Drawing Sheets

"PRIOR ART"

"PRIOR ART"

DRUM BRAKE SERVICE TOOL AND METHOD OF USING THE SAME

This application is a continuation-in-part of Ser. No. 07/385,043, filed July 26, 1989, and now abandoned.

BACKGROUND OF THE INVENTION

This invention relates generally to a device for installation and removal of brake-springs and rollers in drum brakes and to a method of using the same, and more specifically to a device and method for installation and removal of brake-springs and rollers for cam activated drum brake systems.

SUMMARY OF THE PRIOR ART

One of the more common devices used for installing and removing brake-springs from hydraulic brakes is a long-nosed plier-like device as shown in FIGS. 1 and 2. The pliers 10 have a hook 11 on one arm and a point 12 on the other arm. Depending on the type of brake in question, one end of the spring 13 may be attached either to the backing plate 14 of the brake, or as shown in FIG. 2, to a first brake shoe 15. The point 12 of the pliers 10 is positioned on the brake pad 16 and the hook 11 is used to capture the unattached end of the spring 13. The mechanic then forces the two handles 17 of the pliers 10 together, thereby extending the spring 13 to the point that it may be attached to the self adjuster 18.

This type of device has a number of disadvantages. The point 12 is difficult to keep on the brake pad 16, may damage the pad 16 during installation of the spring 13, and the mechanic must use both hands to force the handles 17 together in order to stretch the spring 13. The mechanic therefore has no free hands to assist in guiding the unattached end of the spring 13 into the correct position for installation.

Other devices have been proposed for the removal-/installation of brake-springs, such as those shown in U.S. Pat. No. 2,489,434 granted to Riccio on Nov. 29, 1949; and U.S. Pat. No. 4,063,342, granted to Mitchell et al on Dec. 20, 1977.

These devices are designed for use on hydraulic brake systems, and cannot easily be used to install and remove springs in cam air brake systems. Hydraulic brake systems are presently used on small vehicles, and in such brake systems there are only external springs and no rollers to install. Cam activated brake systems are presently used on tractor-trailer units, and in these systems the springs are internally installed and there are rollers which must be fitted and hooked into the system. The tools such as the long-nosed plier-like device, and those disclosed in the aforementioned U.S. patents, are designed for use with hydraulic brake systems. These tools cannot be used in cam activated brake systems because of the differences in spring tension and alignment between the two systems.

SUMMARY OF THE INVENTION

The brake service tool of the present invention comprises a lever having a pair of spaced, parallel arms disposed at one end thereof. The arms lie in the plane of the lever which is substantially parallel to the width of the lever and are adapted to receive a brake spring substantially perpendicularly therebetween. A brake-spring retaining means is disposed proximate the free end of each of the arms to prevent the spring from accidentally disengaging from the tool when it is pivoted on the cam. The retaining means lie parallel to each other and substantially perpendicular to said plane of the lever and are disposed to engage the coils of the brake spring as the lever is pivoted.

The invention may be used to replace the brake shoes and brake-springs of a brake system which has a support plate; a cam; and first and second brake shoes each having a brake-spring receiving pin; by following the steps of:

(a) positioning first and second brake shoes on the support plate;

(b) passing one end of a brake-spring over the brake-spring pin of the first brake shoe;

(c) engaging the brake-spring in the brake-spring receiving slot of the lever;

(d) positioning the lever on the cam so as to allow it to pivot;

(e) pivoting the lever so as to extend the brake-spring to the point that the second end of the brake-spring lies proximate the brake-spring pin of the second brake shoes (f) passing the second end of the brake-spring over the brake-spring pin of the second brake shoe:

(g) disengaging the brake-spring from the brake-spring receiving slot of the lever.

The brake service tool may also be used to disassemble an existing brake system and to install new brake shoes and a new brake-spring, by following the steps of:

A. engaging the brake-spring in the brake-spring receiving slot of the lever;

B. positioning the lever on the cam so as to allow it to pivot;

C. pivoting the lever so as to extend the brake spring:

D. removing one end of the brake-spring from the brake-spring pin of one of the first or second brake shoes;

E. disengaging the other end of the brake-spring from the brake-spring pin of the other of the first or second brake shoes;

F. removing first and second brake shoes from the support plate;

G. positioning new first and second brake shoes on the support plate; which steps A to G immediately precede steps (b) to (g) as set out above.

The tool may also be used to remove or install a brake roller in the brake shoes. In this instance the tool is provided with a pair of L-shaped spurs mounted substantially parallel to each other on two sides of the lever, said sides being perpendicular to the width of the lever and said spurs being disposed spaced a distance from each other which is being substantially equal to said width of the lever. The spurs are adapted to receive a brake shoe therebetween so as to allow the brake shoe to he removed a sufficient distance from the cam to allow a brake roller to be installed or removed therefrom.

The brake service tool may therefore be used to install brake shoes, brake-springs and rollers, by following the steps of (a) to (g) as described above, as well as the steps:

(a) engaging a first brake shoe with the brake shoe engaging means;

(b) removing the first brake shoe a sufficient distance from the cam to allow a brake roller to be installed;

(c) installing a brake roller;

(d) allowing the first brake shoe to return to its original position on the support plate;

(e) disengaging the first brake shoe from the brake shoe engaging means;

(f) repeating steps (h) to (l) for the second brake shoe.

The brake service tool may also be used to disassemble existing brake systems and install new brake shoes, new brake-springs and new rollers, by following the steps of A to G, followed by the steps of (a) to (l) described above.

The tool may also be used to replace the brake-springs in an existing brake system by following the steps of:

(a) engaging the brake-spring in the brake-spring receiving slot of the lever;

(b) positioning the lever on the can so as to allow it to pivot;

(c) pivoting the lever so as to extend the brake-spring;

(d) removing one end of the brake-spring from the brake-spring pin of one of the first or second brake shoes:

(e) disengaging the other end of the brake-spring from the brake-spring pin of the other of the first or second brake shoes;

(f) disengaging the brake-spring from the slot of the lever;

(g) passing one end of a new brake-spring over the brake-spring pin of the first brake shoe;

(h) engaging the new brake-spring in the brake-spring receiving slot of the lever;

(i) positioning the lever on the can so as to allow it to pivot;

(j) pivoting the lever so as to extend the brake-spring to the point that the second end of the new brake-spring lies proximate the brake-spring pin of the second brake shoe;

(k) passing the second end of the new brake-spring over the brake-spring pin of the second brake shoe:

(l) disengaging the new brake-spring from the brake-spring receiving slot of the lever.

The tool may also be used to replace the rollers in a brake system, by following the steps of:

(a) engaging a first brake shoe with the brake shoe engaging means;

(b) removing the first brake shoe a sufficient distance from the cam to allow a brake roller to be removed;

(c) removing the brake roller;

(d) installing a new brake roller;

(e) allowing the first brake shoe to return to its original position on the cam;

(f) disengaging the first brake shoe from the brake shoe engaging means;

(g) repeating steps (a) to (f) for the second brake shoe.

The tool may also be used to remove or install a brake roller in the brake shoes. In this instance the tool is provided with a pair of L-shaped spurs mounted substantially parallel to each other on two sides of the lever, said sides being perpendicular to the width of the lever and said spurs being disposed spaced a distance from each other which is being substantially equal to said width of the lever. The spurs are adapted to receive a brake shoe therebetween so as to allow the brake shoe to be removed a sufficient distance from the cam to allow a brake roller to be installed or removed therefrom.

The order of installing the rollers into the first and second brake shoes may be reversed, or the rollers may be installed into the brake system before the brake-springs are engaged. The service tool may also be formed so that the lever is wider in the area around the middle of its length than it is at either end. The brake shoe engaging means may be mounted in this wider area of the lever.

BRIEF DESCRIPTION OF THE DRAWINGS

The preferred embodiment of the present invention will be more fully described with reference to the following drawings, in which.

DESCRIPTION OF THE INVENTION

Figure 1:
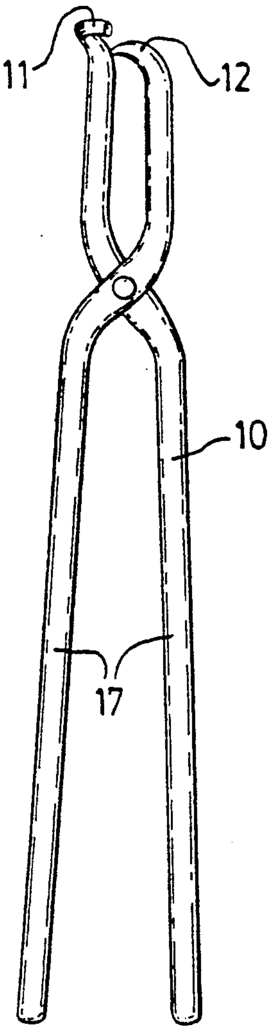
FIG. 1 is a perspective view of the prior art.
Figure 2:
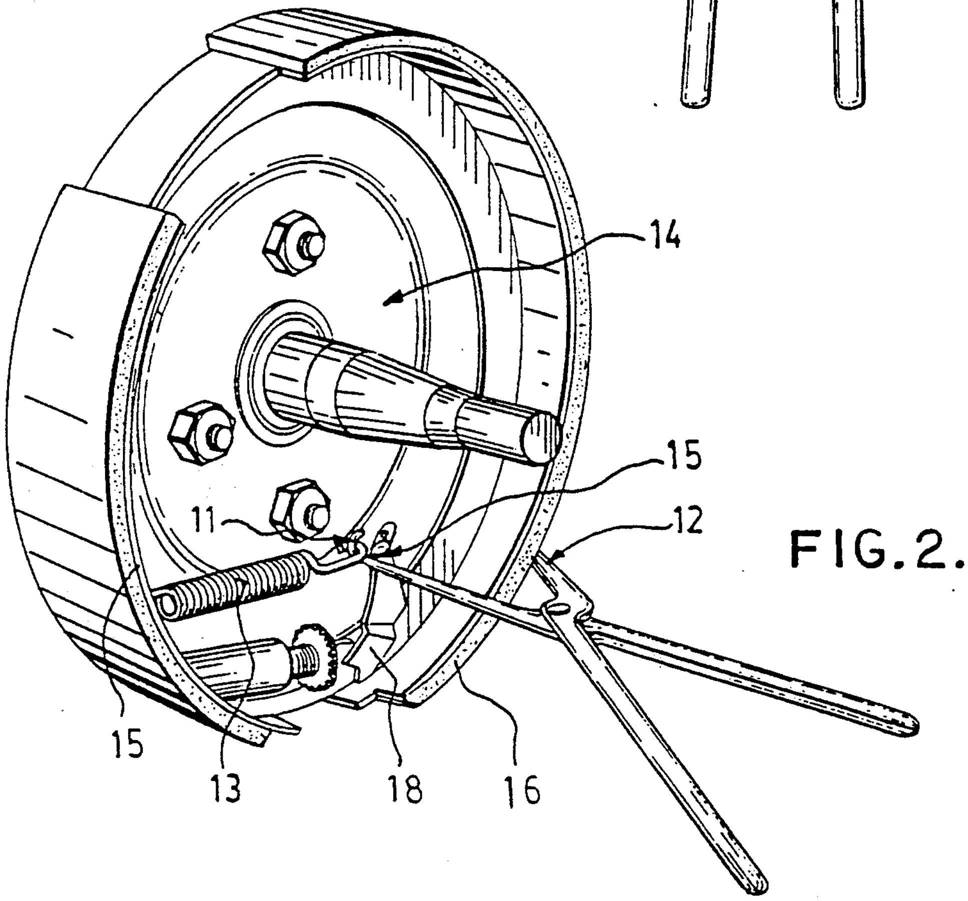
FIG. 2 is a perspective view of the prior art being used to install a brake-spring.
Figure 3:
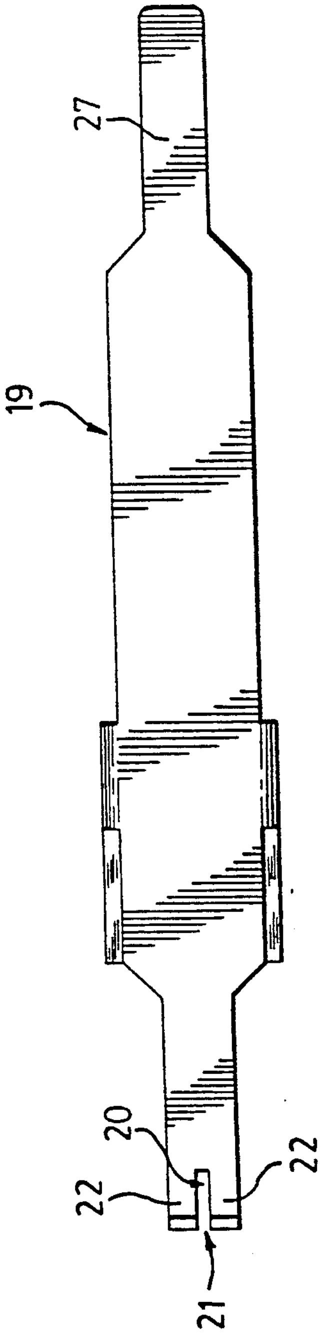
FIG. 3 is a plan view of a brake-spring installer in accordance with the present invention.
Figure 4:
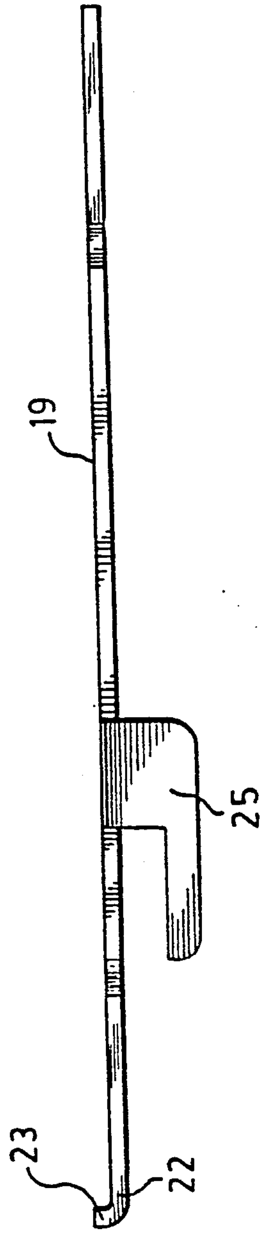
FIG. 4 is a side view of the brake-spring installer as shown in FIG. 3.

Referring to FIG. 3, the drum brake service tool comprises a lever 19 which has a brake-spring receiving slot 20 in one end 21 thereof. The slot 20 runs substantially parallel to the longitudinal axis of the lever 19. The slot 20 causes the end 21 of the lever 19 to be formed into two arms 22, one arm 22 being disposed on either side of the slot 20. A member 23 is attached to the free end of each arm 22, so that the arm is substantially hook-shaped in cross-section as is shown in FIG. 4. The member 23 may be attached to the free end of the arm 22 substantially at right angles, but this is not essential. The member 23 may be attached to the arm at any angle which will cause the arm to be hook-shaped in cross-section and thereby prevent a brake-spring 24 from accidentally disengaging from the slot 20. The member 23 may also be integrally formed with the arm 22.

Figure 5:
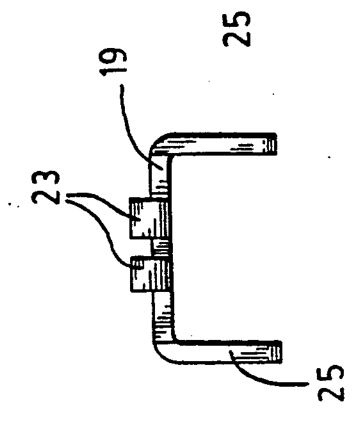
FIG. 5 is a front view of the brake-spring installer as shown in FIG. 3.
Figure 6:
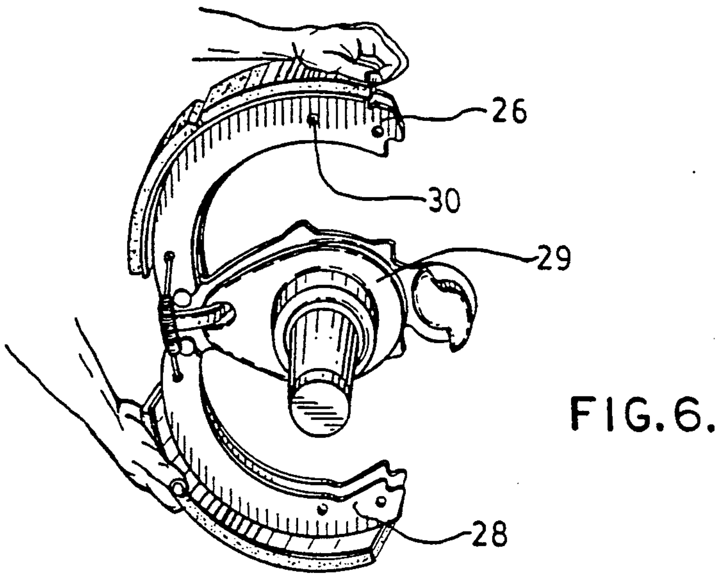
FIG. 6 is a side view of a wheel axle showing the brake shoes being positioned onto the spider.

A pair of L-shaped spurs 25 are mounted on the lever 19 in such a manner that the spurs 25 are disposed substantially parallel to each other and to the longitudinal axis of the lever 19, as shown in FIGS. 4 and 5.

The spurs 25 are disposed a distance from each other which is substantially equal to the width of a brake shoe 26. As can be seen from FIG. 4, the spurs 25 may be mounted on the opposite side of the lever 19 from the side from which the members 23 extend. The lever 19 is formed so that it is wider in the area surrounding the middle of its length than it is at either end. The end of the lever 19 opposite that having the slot 20 is narrowed to form a handle 27.

The drum brake service tool is used in the following manner.

Figure 7:
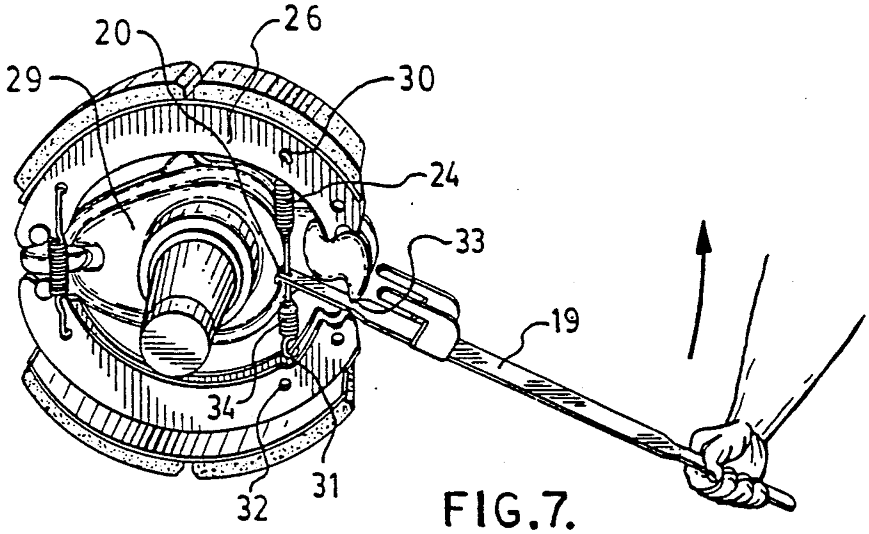
FIG. 7 is a side view of a wheel axle showing the brake-spring installer being positioned to capture the brake-spring.

First and second brakes shoes 26, 28, are positioned around a support plate 29. One hooked end of the brake-spring 24 is passed over a pin 30 in the first brake shoe 26. The lever 19 is positioned in the manner shown in FIG. 7, so that the uncoiled section of the brake spring 24 is engaged in the slot 20 in the lever. The handle end of the lever 19 is then forced upwardly as shown in FIG. 7 so that the lever 19 pivots about an anchor point on the cam 33. As the lever 19 pivots it extends the brake-spring 24. The members 23 at the end of the arms 22 prevent the brake-spring 24 from accidentally disengaging from the slot 20 during the extension of the brake-spring. The brake-spring 24 is extended until the second hooked end 31 of the brake-spring 24 lies proximate the second pin 32 in the second brake shoe 28. The mechanic then uses his free hand to guide the second hooked end 31 of the brake spring 24 around the second pin 32.

Once the brake-spring is engaged on the pin 32, the mechanic may disengage the lever 19 from the brake-spring 24 by lifting the lever 19 upwardly so that the members 23 do not engage the coils 34 of the brake-spring when the spring is moved out of the slot 20.

Figure 8:
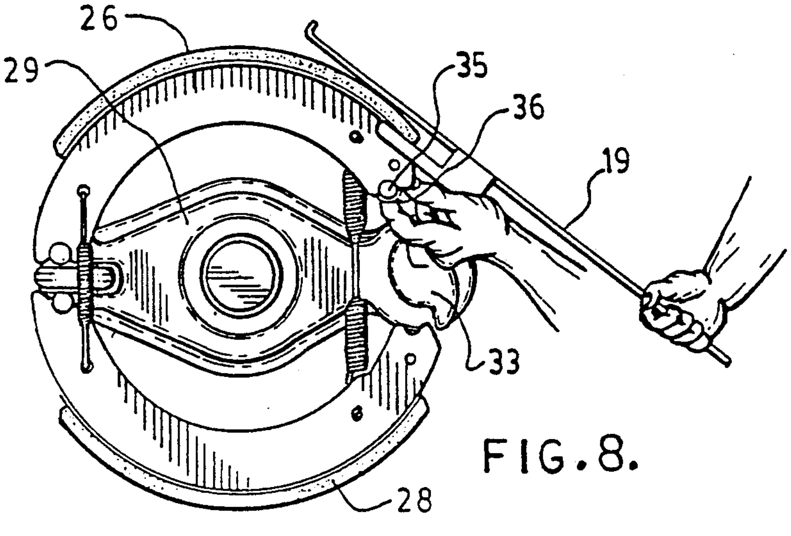
FIG. 8 is a side view of the wheel axel showing the brake-spring installer being positioned to lift one of the brake shoes upwardly for installation of a roller.

The service tool may also be used to assist in the installation of brake rollers 35 as shown in FIG. 8. In this operation, the spurs 25 are position so as to engage either the first or second brake shoe 26, 28. Once the brake shoe is engaged therein, the handle end of the lever 19 is moved upwardly for the first brake shoe 26, or downwardly for the second brake shoe 28, so that the brake shoe is removed off the cam 33 a sufficient distance to allow a roller 35 to be inserted. Without the use of this tool, it is very common for a mechanic to jam his fingers when performing this function. The tool, however, permits the mechanic to lift the brake shoes 26, 28 from the cam 33 with relative ease using only one hand, and thereby leaves the other hand free for positioning of the roller 35. Once the roller 35 has been installed, a locking clip 36 is passed over the roller 35 to hold it in position. The mechanic may then insert a roller 35 into the other brake shoe in a similar manner.

The invention may be used to replace the brake shoes 26, 28 and brake-springs 24 of a brake system which has a support plate 29; same 33; and first and second brake shoes 26, 28 each having a brake-spring receiving pin 30, 32; by following the steps of:

(a) positioning first and second brake shoes 26,28 on the support plate 29;
(b) passing one end of a brake-spring 24 over the brake-spring pin 30 of the first brake shoe 26;
(c) engaging the brake-spring 24 in the brake-spring receiving slot 20 of the lever 19;
(d) positioning the lever 19 on the cam 33 so as to allow it to pivot;
(e) pivoting the lever 19 so as to extend the brake-spring 24 to the point that the second end 31 of the brake-spring 24 lies proximate the brake-spring pin 32 of the second brake shoe 28;
(f) passing the second end 31 of the brake-spring 24 over the brake-spring pin 32 of the second brake shoe 28;
(g) disengaging the brake-spring 24 from the brake-spring receiving slot 20 of the lever 19.

The brake service tool may also be used to disassemble an existing brake system and to install new brake shoes and a new brake-spring, by following the steps of:

A. engaging the brake-spring 24 in the brake-spring receiving slot 20 of the lever 19;
B. positioning the lever 19 on the cam 33 so as to allow it to pivot;
C. pivoting the lever 19 so as to extend the brake-spring 24;
D. removing one end of the brake-spring from the brake-spring pin 30, 32 of one of the first or second brake shoes 26, 28;
E. disengaging the other end of the brake-spring from the brake-spring pin 30, 32 of the other of the first or second brake shoes 26, 28;
F. removing first and second brake shoes 26, 28 from the support plate 29;
G. positioning new first and second brake shoes 26, 28 on the support plate 29;

which steps A to 6 immediately precede steps (b) to (g) as set out above.

The drum brake service tool of the present invention may also include a brake shoe engaging means for engaging with the brake shoes so that they nay be removed a sufficient distance off the brake support plate to allow for the installation of brake rollers.

The brake service tool may therefore be used to install brake shoes, brake-springs and rollers, by following the steps of (a) to (g) as described above, as well as the steps:

(h) engaging a first brake shoe 26 with the brake shoe engaging means;
(i) removing the first brake shoe 26 a sufficient distance from the support plate 29 to allow a brake roller 35 to be installed;
(j) installing a brake roller 35;
(k) allowing the first brake shoe 26 to return to its original position on the cam 33;
(l) disengaging the first brake shoe 26 from the brake shoe engaging means;
(m) repeating steps (h) to (l) for the second brake shoe 28.

The brake service tool may also be used to disassemble existing brake systems and install new brake shoes, new brake-springs and new rollers, by following the steps of A to G, followed by the steps of (a) to (l) as described above.

The tool may also be used to replace the brake-springs in an existing brake system by following the steps of:

(a) engaging the brake-spring 24 in the brake-spring receiving slot 20 of the lever 19;
(b) positioning the lever 19 on the cam 33 so as to allow it to pivot;
(c) pivoting the lever 19 so as to extend the brake-spring 24;
(d) removing one end of the brake-spring 24 from the brake-spring pin of one of the first or second brake shoes 26, 28;
(e) disengaging the other end of the brake-spring 24 from the brake-spring pin of the other of the first or second brake shoes 26, 28;
(f) disengaging the brake-spring 24 from the slot of the lever 19;
(g) passing one end of a new brake-spring over the brake-spring pin 30 of the first brake shoe 26;
(h) engaging the new brake-spring 24 in the brake-spring receiving slot 20 of the lever 19.
(i) positioning the lever 19 on the cam 33 so as to allow it to pivot;
(j) pivoting the lever 19 so as to extend the brake-spring 24 to the point that the second end 31 of the new brake-spring 24 lies proximate the brake-spring pin 32 of the second brake shoe 28;
(k) passing the second end 31 of the new brake-spring 24 over the brake-spring pin 32 of the second brake shoe 28;
(l) disengaging the new brake-spring 24 from the brake-spring receiving slot 20 of the lever 19.

The tool may also be used to replace the rollers 35 in a brake system, by following the steps of:

(a) engaging a first brake shoe 26 with the brake shoe engaging means;

(b) removing the first brake shoe 26 a sufficient distance from the support plate 29 to allow a brake roller 35 to be removed;

(c) removing the brake roller 35.

(d) installing a new brake roller 35;

(e) allowing the first brake shoe 26 to return to its original position on the cam 33;

(f) disengaging the first brake shoe 26 from the brake shoe engaging means;

(g) repeating steps (a) to (f) for the second brake shoe 28.

The order for installing or removing rollers 35 from the first or second brake shoes 26, 28 is not important, nor is it essential that the brake-spring 24 be installed or removed before the rollers 35.

There are many variations possible with respect to this invention, which variations will be obvious to one skilled in the art. These obvious variations are considered to be part of the present invention.

The embodiments of the invention in which an exclusive property or privilege is claimed are defined as follows:

1. A brake service tool for installing or removing brake springs and rollers in cam activated drum brakes; which brakes include a cam and a pair of brake shoes for engaging said cam; said shoes having pins mounted on their innermost surfaces for removable attachment of a brake spring, the brake spring having a plurality of coils disposed somewhere along its length; said brake spring being installable in said drum brakes in such a manner that it lies internally attached between the brake shoes; said tool comprising:

a lever being substantially rectangular in shape, having a width and a length, said length being longer than the width; said lever having a pair of spaced parallel arms disposed at one end thereof, the arms lying in the same plane as the lever and being adapted to receive the brake spring substantially perpendicularly therebetween;

a brake-spring retaining means for engaging the coils of the brake spring to prevent it from slipping out from between the arms when the lever is pivoted on the cam; said retaining means being disposed on each arm; the retaining means lying parallel to each other and substantially perpendicular to the arms; so that when the lever is pivoted, the brake spring is either expanded or compressed by the arms, the expansion or compression of the brake spring being dependent on the direction in which the lever is pivoted;

a pair of L-shaped spurs mounted substantially parallel to each other on two sides of the lever, said sides being perpendicular to the width of the lever and said spurs being disposed spaced a distance from each other which is being substantially equal to said width of the lever; said spurs being adapted to receive a brake shoe therebetween so as to allow the brake shoe to be removed a sufficient distance from the cam to allow a brake roller to be installed or removed therefrom.

2. A brake service tool as defined in claim 1, wherein the arms are adapted to expand or compress a plurality of brake springs sizes.

* * * * *